United States Patent
Hsu (10) Patent No.: US 9,842,280 B2
(45) Date of Patent: Dec. 12, 2017

(54) SYSTEM AND METHOD FOR EVALUATING A CLASSIFIER IMPLEMENTED WITHIN AN IMAGE SIGNAL PROCESSOR

(71) Applicant: OmniVision Technologies, Inc., Santa Clara, CA (US)

(72) Inventor: Ming Kai Hsu, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/932,926

(22) Filed: Nov. 4, 2015

(65) Prior Publication Data

US 2017/0124429 A1    May 4, 2017

(51) Int. Cl.
G06K 9/62 (2006.01)
G06K 9/00 (2006.01)

(52) U.S. Cl.
CPC ....... G06K 9/6265 (2013.01); G06K 9/00228 (2013.01); G06K 9/6231 (2013.01); G06K 9/6253 (2013.01); G06K 9/6267 (2013.01)

(58) Field of Classification Search
CPC ... G06K 9/6265; G06K 9/6267; G06K 9/6231
USPC ................................. 382/159, 160
See application file for complete search history.

(56) References Cited

U.S. PATENT DOCUMENTS

| | | | |
|---|---|---|---|
| 6,154,559 A * | 11/2000 | Beardsley | A61B 3/113 340/576 |
| 6,661,907 B2 | 12/2003 | Ho et al. | |
| 7,796,831 B2 | 9/2010 | Tanaka | |
| 8,099,373 B2 | 1/2012 | Kiao et al. | |
| 8,804,046 B1 * | 8/2014 | Kumar | H04N 17/02 348/242 |
| 2004/0070666 A1 | 4/2004 | Bober et al. | |
| 2009/0210362 A1 * | 8/2009 | Xiao | G06K 9/6256 706/12 |

(Continued)

OTHER PUBLICATIONS

Hjelmås, et al., "Face Detection: A Survey", Computer Vision and Image Understanding, vol. 83, No. 3, Sep. 2001, pp. 236-274.

(Continued)

*Primary Examiner* — Andrew Moyer
(74) *Attorney, Agent, or Firm* — Lathrop Gage LLP (57) ABSTRACT

A system for evaluating a classifier of an image signal processor (ISP) includes (i) a microprocessor and (ii) memory storing training images, the microprocessor being capable of sending each training image to the ISP. The system includes machine-readable instructions stored within the memory and executed by the microprocessor capable of: (i) selecting a subset of images based upon a divider position, (ii) controlling the ISP to classify each image as belonging or not belonging to an object class, (iii) determining a positive-match count, (iv) determining an error count based upon the positive-match count and total number of training images belonging to the object class, (v) repeating, for other divider positions, steps of selecting, controlling, and determining to identify an optimal divider position and a minimum-error count; and (vi) determining the classifier's optimality by comparing the optimal divider position to a predetermined optimal divider position and a predetermined minimum-error count.

10 Claims, 3 Drawing Sheets

(56) References Cited

U.S. PATENT DOCUMENTS

2015/0254832 A1* 9/2015 Plihal .................. G06T 7/001
382/149

OTHER PUBLICATIONS

Al-Allaf, "Review of Face Detection Systems Based Artificial Neural Networks Algorithms", IJMA, vol. 6, No. 1, Feb. 2014, 16 pp.

Yang, et al., "Detecting Faces in Images: A Survey", IEEE Transactions on Pattern Analysis and Machine Intelligence, vol. 24, No. 1, Jan. 2002, pp. 34-58.

"You can do it, and your camera can do it—but how?", Jul. 2010, pulled from http://www.techradar.com/us/news/software/applications/how-face-detection-works-703173, 5 pp.

Lu, et al., "A Survey of Face Detection, Extraction and Recognition", Computing and Informatics, vol. 22, pp. 163-195 (2003).

Scherbaum, et al., "Fast Face Detector Training Using Tailored Views", Computer Vision (ICCV) 2013, pulled from http://www.cv-foundation.org/openaccess/content_ICCV_2013/papers/Scherbaum_Fast_Face_Detector_2013_ICCV_paper.pdf, pp. 2848-2855.

Li, et al., "FloatBoost Learning for Classification", CiteSeer Jun. 2003, pulled from https://www.researchgate.net/publication/2942072_FloatBoost_Learning_for_Classification, 8 pp.

Zhang, et al., "A Survey of Recent Advances in Face Detection", Microsoft Research JSR-TR-2010-66, Jun. 2010, 17 pp.

Office Action corresponding to Taiwanese Patent Application No. 105133779, dated Jul. 18, 2017.

* cited by examiner

SYSTEM AND METHOD FOR EVALUATING A CLASSIFIER IMPLEMENTED WITHIN AN IMAGE SIGNAL PROCESSOR

BACKGROUND

Object recognition based on artificial intelligence (AI) is useful in applications including face or facial feature detection in mobile devices and automated teller machines (ATMs), machine recognition of facial expressions, barcodes, or gestures, and vehicle-mounted automatic warning systems. A fundamental topic of AI-based object recognition is 1-D (one-dimensional) feature classification, in which a classifier implemented within an image signal processor (ISP) examines an image to determine whether or not the image includes an object that belongs to a specific object class, such as face for face detection applications.

Training a classifier to accurately classify images involves having the classifier examine each image in a training image set as either a face or non-face, based on whether the image includes or does not include a human face. Such training requires the classifier to develop effective artificial intelligence to detect presence of a face in an image. A single round of learning involves the classifier classifying each image of the training image set. The training image set may include approximately 40,000 training images (with half of the images including a face, for example). In some applications, 3,000 rounds may be required.

To determine whether a classifier has been adequately trained, the classifier is evaluated by classifying images in a training image set. The training image need not be the same training image set used to train the classifier. Classifying images are computationally intensive and hence take a significant time to run, which increases costs of developing improved object-detection technologies.

SUMMARY OF THE INVENTION

The embodiments disclosed herein pertain to efficient evaluation systems and methods for evaluating a classifier that minimize the number of classifier operations required to complete the evaluation method.

In one embodiment, a system for evaluating a classifier implemented within an image signal processor (ISP) is disclosed. The system includes a microprocessor and memory storing a training image set having a plurality of images. The microprocessor is capable of sending each of the plurality of images to the ISP. The system also includes machine-readable instructions stored within the memory and executed by the microprocessor capable of: (i) selecting a subset of images of the training image set based upon a divider position within the training image set, (ii) controlling the ISP to classify each of the images in the subset as belonging to or not belonging to an object class, (iii) determining a positive-match count equal to total number of images in the image subset classified as belonging to the object class, (iv) determining an error count based upon (a) total number of images of the training image set belonging to the object class, and (b) the positive-match count, (v) repeating, for a plurality of other divider positions within the training image set, the steps of selecting, controlling, and determining to identify an optimal divider position corresponding to at least one of (a) a minimum-error count and (b) a maximum-error count; and (vi) determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

In another embodiment, a method for evaluating a classifier implemented within an image signal processor (ISP) to identify an object class in a received electronic image signal is disclosed. The method includes steps of: (i) selecting a subset of images of a training image set based upon a divider position within the training image set, (ii) controlling the ISP to classify each of the images in the subset as either belonging or not belonging to the object class, (iii) determining a positive-match count equal to total number of images in the image subset classified as belonging to the object class, (iv) determining an error count based upon (a) total number of images of the training image set belonging to the object class, and (b) the positive-match count, (v) repeating, for a plurality of other divider positions within the training image set, the steps of selecting, controlling, and determining to identify an optimal divider position corresponding to at least one of (a) a minimum error count and (b) a maximum-error-count, and (vi) determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

DETAILED DESCRIPTION OF THE EMBODIMENTS

Figure 1:
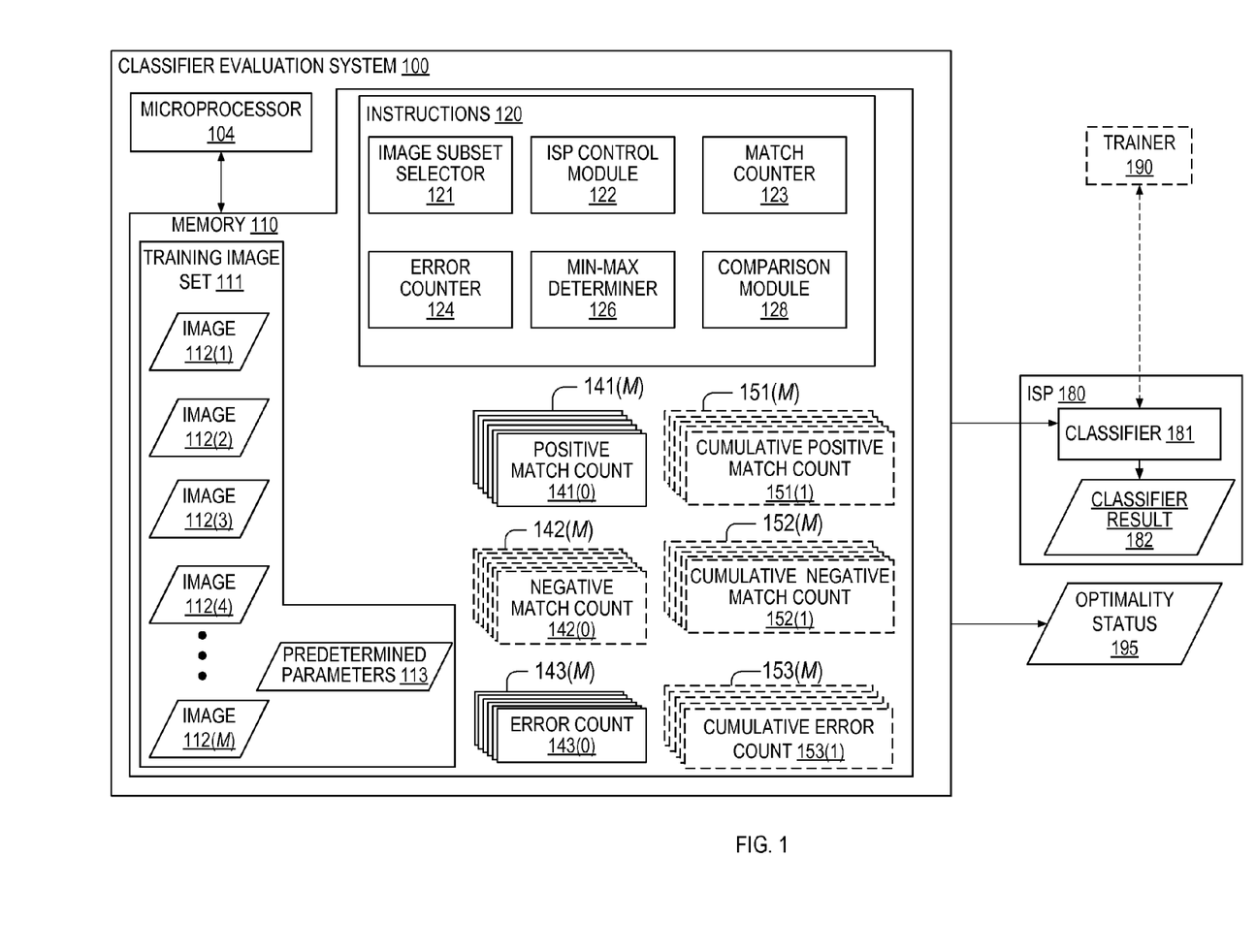
FIG. 1 shows one exemplary classifier evaluation system for evaluating a classifier implemented within an image signal processor, in an embodiment.

FIG. 1 shows one exemplary classifier evaluation system 100 for evaluating a classifier 181 implemented within an image signal processor (ISP) 180. Classifier evaluation system 100 includes a microprocessor 104 and a memory 110. Memory 110 stores machine-readable instructions 120 and a training image set 111 that includes a plurality of images 112(1-M) and predetermined parameters 113, which are described below. System 100 is capable of sending each of the plurality of images 112 to ISP 180.

Training image set 111 is used to evaluate classifier 181. Training image set 111 may be a face database, and may be sold or freely provided with information pertaining to its predetermined optimal divider position and corresponding predetermined minimum error count. If classifier 181, through an evaluation process, computes a minimum error count and associated optimal divider position that matches the predetermined optimal divider position and corresponding predetermined minimum error count, then the classifier may be deemed as optimally trained. The meanings of predetermined optimal divider position and corresponding predetermined minimum error count are described below in relation to Table 2.

Machine-readable instructions 120 are stored in a non-transitory portion of memory 110 and are executable by microprocessor 104 to implement the functionality of classifier evaluation system 100. Machine-readable instructions 120 include an image subset selector 121, an ISP control module 122, a match counter 123, an error counter 124, a min-max determiner 126, and a comparison module 128.

Classifier 181 detects a face in an image 112 using at least one object-class detection methods known in the art, such as knowledge-based methods, feature invariant methods, template matching methods, and appearance-based methods. For each image 112, classifier 181 executes an object-class detection method and outputs a classifier result 182, based on an output of the at least one object-class detection method, to classifier evaluation system 100, which in turn generates an optimality status 195 of classifier 181. Optimality status 195 has one of two values indicating whether classifier 181 is sufficiently trained or is insufficiently trained. Without departing from the scope hereof, optimality status 195 may indicate a degree of optimality of classifier 181.

FIG. 1 also shows a trainer 190 for training classifier 181 to more accurately detect faces when, for example, optimality status 195 indicates that classifier 181 is insufficiently trained. In an embodiment, trainer 190 is part of classifier evaluation system 100.

Figure 2:
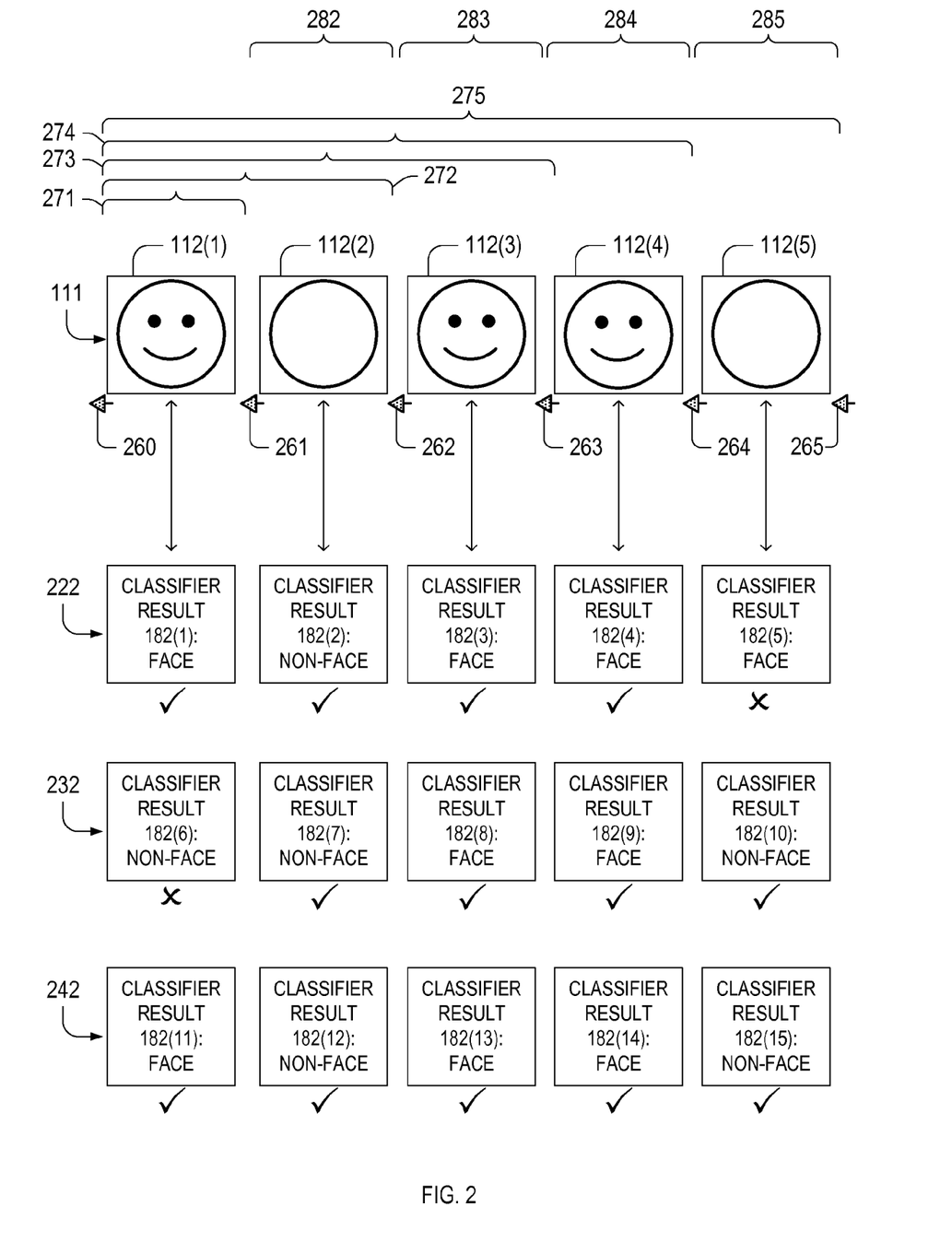
FIG. 2 shows one exemplary training image set and three exemplary classifier result sets.

FIG. 2 shows training image set 111 of FIG. 1 with five exemplary images 112(1-5). Each image 112 either belongs to or does not belong to an object class face (hereafter, "object class"), that is, each image 112 either includes a face, or does not include a face. Specifically, images 112(1), 112(3), and 112(4) belong to the object class because they include a face, while images 112(2) and 112(5) do not belong to the object class because they do not include a face. The total number of images of training image set 111 belonging to the object class is three, while the total number of images of training image set 111 not belonging to the object class is two.

Hereinafter, the following notation applies: The number of images in a training set is denoted as M. The number of images in a training set belonging to the object class is denoted as $N_1$. The number of images in a training set not belonging to the object class is denoted as $N_0$, such that $N_0+N_1=M$. For training image set 111, $M=5$, $N_1=3$, and $N_0=2$.

corresponds to a null subset, that is, one containing no images. See Table 1.

TABLE 1

| divider position | image subset | images of training image set 111 in image subset |
|---|---|---|
| 260 | null | none |
| 261 | 271 | 112(1) |
| 262 | 272 | 112(1), 112(2) |
| 263 | 273 | 112(1), 112(2), 112(3) |
| 264 | 274 | 112(1), 112(2), 112(3), 112(4) |
| 265 | 275 | 112(1), 112(2), 112(3), 112(4), 112(5) |

Training image set 111 may include thousands of images of faces and non-faces; however, the example of FIG. 2 shows only five images for clarity of illustration. To evaluate classifier 181, system 100 determines a minimum error count and associated optimal divider position for training image set 111, and compares these computed results to the predetermined minimum error count (equal to one) and the associated predetermined optimal divider position (divider position 264) for the training image set.

Table 2 illustrates exemplary predetermined classification of training image set 111 of FIG. 2, defining a predetermined minimum error count and a corresponding predetermined optimal divider position. In Table 2, column (c4) shows the number of images 112(1-5) in training image set 111 belonging to the object class, which is three. Column (c5) indicates, for each divider position, the number of images in the subset that do not belong to the object class, that is, the number of non-face images. Column (c6) indicates, for each divider position, the number of images in the subset that do belong to the object class, that is, the number of images that are faces. Column (c7) indicates an error count for each divider position as the quantity in column (c6) subtracted from the sum of the quantities in columns (c4) and (c5). That is, error count=(c4)+(c5)−(c6).

Inspection of column (c7) reveals that divider position 264 corresponds to a minimum error count. Hence, for training image set 111, divider position 264 is the predetermined optimal divider position. Referring to FIG. 1, predetermined minimum error count (equal to 1) and associated predetermined optimal divider position 264 are examples of predetermined parameters 113.

TABLE 2

| (c1) divider position | (c2) image subset | (c3) # of images in image subset | (c4) # of faces in training image set | (c5) # of non-faces in subset | (c6) # of faces in subset | (c7) error count (c4) + (c5) − (c6) |
|---|---|---|---|---|---|---|
| 260 | null | 0 | 3 | 0 | 0 | 3 |
| 261 | 271 | 1 | 3 | 0 | 1 | 2 |
| 262 | 272 | 2 | 3 | 1 | 1 | 3 |
| 263 | 273 | 3 | 3 | 1 | 2 | 2 |
| 264 | 274 | 4 | 3 | 1 | 3 | 1 |
| 265 | 275 | 5 | 3 | 2 | 3 | 2 |

FIG. 2 shows divider positions 261-265 that denote different subsets of images 112 of training image set 111. As shown in FIG. 2, divider position 261 corresponds to image subset 271 that contains image 112(1); divider position 262 corresponds to image subset 272; divider position 263 corresponds to image subset 273; divider position 264 corresponds to image subset 274; divider position 265 corresponds to image subset 275; and divider position 260

Figure 3:
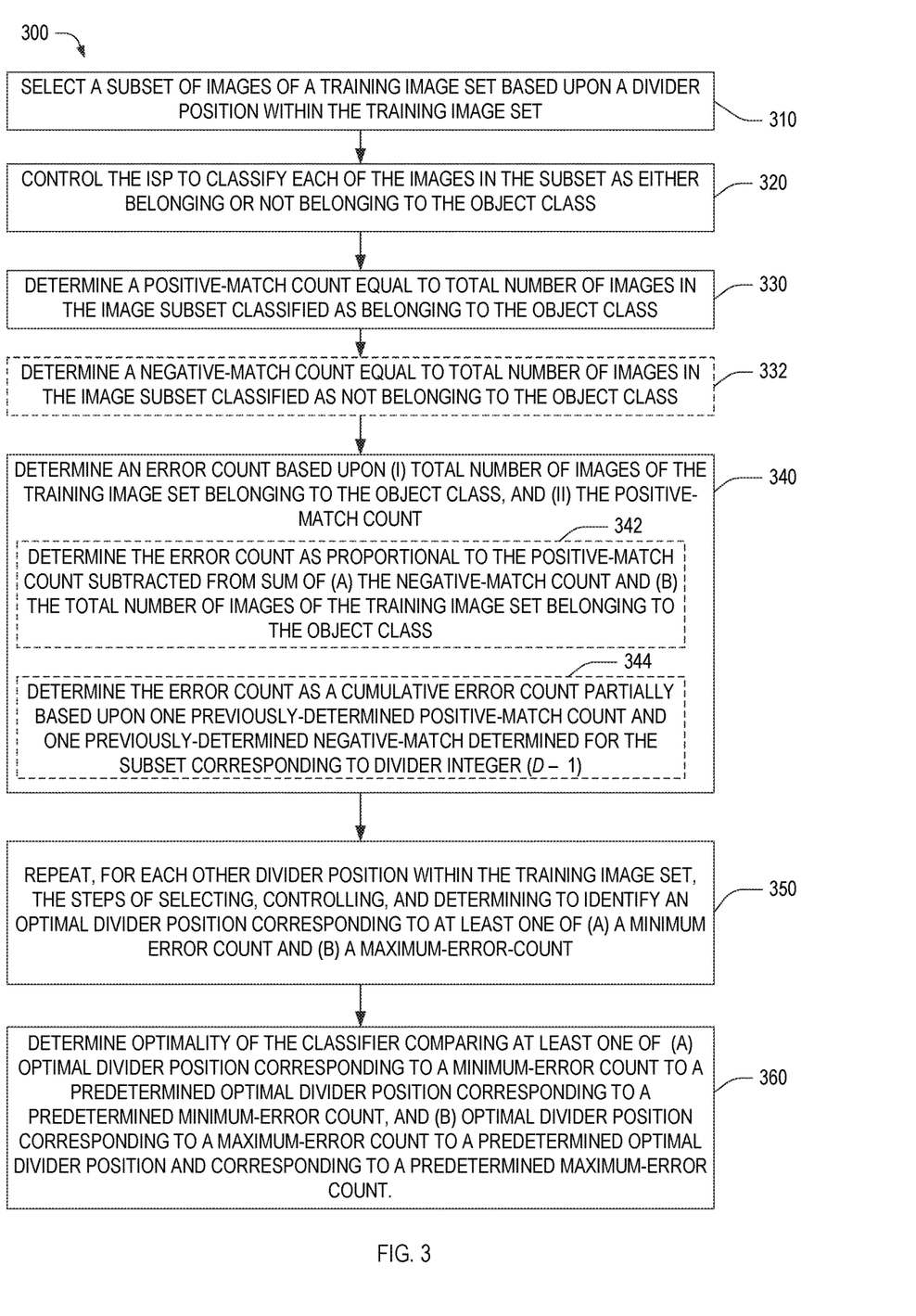
FIG. 3 is a flowchart illustrating one exemplary method for evaluating a classifier implemented within an image signal processor, in an embodiment.

FIG. 3 is a flowchart illustrating one exemplary method 300 for evaluating a classifier implemented within an image signal processor, to identify an object class in a received electronic image signal. Method 300 is for example implemented within instructions 120 of classifier evaluation system 100 of FIG. 1.

In step 310, method 300 selects a subset of images of a training image set based upon a divider position within the training image set. In an example of step 310, image subset selector 121 of classifier evaluation system 100 selects image subset 271 based upon a divider position 261 within training image set 111. This example may be a first iteration of step 310 corresponding to divider position 261, where in subsequent iterations, executed in step 350 discussed below, image subset selector 121 selects an image subset based upon one of divider position 262-265.

In step 320, method 300 controls the ISP to classify each of the images in the subset as either belonging or not belonging to the object class. In example of step 320, ISP control module 122 controls classifier 181 of ISP 180 (FIG. 1) to classify image 112(1) of image subset 271 as either belonging to the object class and stores this result as classifier result 182(11) of a classifier result set 242.

In this example of step 320 combined with examples step 350, which repeats step 320 for image subsets 272-275, classifier 181 outputs classifier results 182(11-15). Each classifier result 182(11-15) is a correct classification of images 112(1-5) respectively, as shown in FIG. 2. For example, classifier result 182(11) is "face" and image 112(1) includes a face. That each classifier result 182(11-15) is a correct indicates that classifier 181 is sufficiently trained. In practice, classifier 181 would often produce classifier results 182(11-15) only after several rounds of training by trainer 190. Between these training rounds, classifier 181 may be evaluated via system 100 implementing method 300, and classifier 181 may produce inaccurate classifier results such as classifier results 182(5) and 182(6).

In step 330, method 300 determines a positive-match count equal to total number of images in the image subset classified as belonging to the object class in step 320. In an example of step 330, match counter 123 of classifier evaluation system 100 determines a positive-match count 141(1) equal to total number of images in image subset 271 classified as belonging to the object class ($N_1$). Positive-match count 141(1) is stored in memory 110 of classifier evaluation system 100. For image subset 271, positive-match count 141(1) is one because classifier result 182(1) is "face." If in step 320 ISP 180 classified image 112(1) as a non-face (by outputting classifier result 182(6) for example), positive-match count 141(1) would be zero. Note that positive-match counts 141 are independent of the correctness of classifier results 182(11-15).

Step 332 is optional. If included, in step 332, method 300 determines a negative-match count equal to total number of images ($N_0$) in the image subset classified as not belonging to the object class. In an example of step 332, match counter 123 of classifier evaluation system 100 determines a negative-match count 142(1) equal to total number of images in image subset 271 classified as not belonging to the object class. For image subset 271, negative-match count 142(1) equals zero. Note that negative-match counts 142 are independent of the correctness of classifier results 182(11-15). Note that negative-match counts 142 may be computed directly from positive-match counts 141: $N_1 = M - N_0$. Determination of positive-match counts 141 and negative match-counts 142 may be performed in a single step.

In an embodiment, step 330 includes a step writing at least one of the positive-match count and negative-match count to memory. For example, microprocessor 104 executes instructions 120 to write positive-match count 141(1) and negative-match count 142(1) to memory 110.

In step 340, method 300 determines an error count based upon (i) total number of images of the training image set belonging to the object class ($N_1$), and (ii) the positive-match count. In an example of step 340, error counter 124 of classifier evaluation system 100 determines an error count 143(1) based upon (i) total number of images of training image set 111 belonging to the object class ($N_1 = 3$), and (ii) positive-match count 141(1), which equals one for training image set 111 given classifier result 182(1).

Step 340 may include optional step 342. If included, in step 342, method 300 determines the error count as proportional to the positive-match count subtracted from sum of (a) the negative-match count and (b) the total number of images of the training image set belonging to the object class ($N_1$). In an example of step 342, error counter 124 of classifier evaluation system 100 determines an error count 143(1) corresponding to image subset 271 as positive-match count 141(1) (equal to one) subtracted from the sum of negative match count 142(1) (equal to zero) and the total number of images of training image set 111 belonging to the object class ($N_1 = 3$), to yield an error count equal to two.

In an embodiment, step 340 includes a step writing the error count to memory. For example, microprocessor 104 executes instructions 120 to write error count 143(1) to memory 110.

In step 350, method 300 repeats, for a plurality of other divider positions within the training image set, steps 310, 320, 330, and 340 to identify an optimal divider position corresponding to at least one of (a) a minimum error count and (b) a maximum-error-count. In an example of step 350, microprocessor 104 executes instructions 120 to repeat, for at least two divider positions 262-265 (and corresponding image subsets 272-275), steps 310, 320, 330, 332, 340, and 342. In this first example, microprocessor 104 executes instructions 120 to repeat steps 310, 320, 330, 332, 340, and 342 for each divider position 262-265. This first example of step 350 provides positive match counts, negative match counts, and error counts shown in Tables 3 and 4.

Table 3 shows values of positive match counts 141, negative match counts 142, and error counts 143 corresponding to divider positions 261-265 associated with respective image subsets 271-275. Table 3 includes eight columns labeled (c1)-(c8). When repeated as part of step 330, classifier evaluation system 100 (FIG. 1) may write negative-match counts of column (c5) and positive-match counts of columns (c6) to memory 110 as negative-match counts 142(2-5) and positive-match counts 141(2-5) respectively. Positive-match counts 141(2-5) are stored in memory 110 of classifier evaluation system 100. Negative-match counts 142(2-5) may be stored in memory 110 of classifier evaluation system 100.

Each row of column (c7) shows an error count corresponding to an image subset denoted in column (c2). For a given row, each error count is computed as the positive match count subtracted from the sum of the negative match count and the number of images in the training image set belonging to the object class ($N_1$). Expressed in terms of column labels, (c7)=(c4)+(c5)−(c6).

In the first example of step 350, microprocessor 104 executes instructions 120 to write error counts 143(2-5) to memory 110 when repeating step 340 for divider positions 262-265. Also in this example of step 350, min-max determiner 126 of classifier evaluation system 100 identifies an optimal divider position corresponding to a minimum-error count value from error counts 143. Inspection of Table 3 reveals that divider position 264 has the smallest error count. Divider position 264 is also the predetermined optimal divider position (Table 2), which is to be expected, as in this example step 350 results from error counts associated with classifier result set 242, which are all correct. Hence, the information and calculations of Table 3 is equivalent to those in Table 2.

Without departing from the scope hereof, training image set 111 may have more than one optimal divider position. For example, if image 112(4) were not a face, divider positions 261 and 263 would each have error count equal to a minimum error count equal to one.

Column (c7) may also include an error count corresponding to a null image subset. In this case, both positive and negative-match counts equal zero, such that the error count equals the number of images in the training set belonging to the object class. In embodiment, classifier 181 need not classify any images 112 to compute this error count, as $N_0$ and $N_1$ are known a priori.

TABLE 3

| (c1) divider position | (c2) image subset | (c3) # of images in image subset | (c4) # images in object class, $N_1$ | (c5) negative-match count 142 | (c6) positive-match count 141 | (c7) error count 143: (c4) + (c5) − (c6) | (c8) number of classifier operations |
|---|---|---|---|---|---|---|---|
| 260 | null | 0 | 3 | 0 | 0 | 3 | 0 |
| 261 | 271 | 1 | 3 | 0 | 1 | 2 | 1 |
| 262 | 272 | 2 | 3 | 1 | 1 | 3 | 2 |
| 263 | 273 | 3 | 3 | 1 | 2 | 2 | 3 |
| 264 | 274 | 4 | 3 | 1 | 3 | 1 | 4 |
| 265 | 275 | 5 | 3 | 2 | 3 | 2 | 5 |

In step 340, error counts may also be computed, or alternatively computed, to find divider positions corresponding to maximum error counts, as shown in Table 4. Table 4 differs from Table 3 in two ways. First, column (c4) denotes the number of images in the training image set not in the object class. Second, error counts are computed as the negative match count (c5) subtracted from the sum of column (c4) and the positive match count, column (c6). Error counts of Table 3 and Table 4 provide the same information about classifier 181, as each error count of Table 4 is a complement of its corresponding error count in Table 3—their sum equals the number of images in training image set 111 (N=5). Inspection of Table 4 reveals that divider positions 264 has the maximum error counts, and hence corresponds to the same optimal divider position as that determined from error counts of Table 3.

TABLE 4

| (c1) divider position | (c2) image subset | (c3) # of images in image subset | (c4) # images not in object class, $N_0$ | (c5) negative-match count 142 | (c6) positive-match count 141 | (c7) error count 143: (c4) + (c6) − (c5) | (c8) number of classifier operations |
|---|---|---|---|---|---|---|---|
| 260 | null | 0 | 2 | 0 | 0 | 2 | 0 |
| 261 | 271 | 1 | 2 | 0 | 1 | 3 | 1 |
| 262 | 272 | 2 | 2 | 1 | 1 | 2 | 2 |
| 263 | 273 | 3 | 2 | 1 | 2 | 3 | 3 |
| 264 | 274 | 4 | 2 | 1 | 3 | 4 | 4 |
| 265 | 275 | 5 | 2 | 2 | 3 | 3 | 5 |

Column (c8) of Tables 4 and 5 show the number of classifier operations required of classifier 181 for classifier evaluation system 100 to generate an error count when executing step 340 of method 300. In the first example of step 350, error counts for image subsets 272-275 require classifier 181 to perform classifier operations already performed when computing an error count for a previous subset. For example, the error count corresponding to image subset 272 requires classifier 181 to generate classifier results 182(11) and 182(12), even though classifier 181 has already generated classifier result 182(11) when computing the error count corresponding image subset 271.

To remedy this redundancy, step 340 may include optional step 344, for example, when divider positions denotes single-member image subsets such as image subsets 271 and single-member image subsets 282-285 shown in Table 5. If included, in step 344, method 300 determines the error count for an $D^{th}$ subset (D>1) as a cumulative error count that is partially based upon one previously-determined positive-match count and one previously-determined negative-match determined for the subset corresponding to divider integer (D−1). In an example of step 344, image subsets 282-285 correspond to subsets with M values of 2-5 respectively, and classifier evaluation system 100 determines the error count for single-member image subset 282 as a cumulative error count 153(2) in part based on the error count determined for image subset 271.

TABLE 5

| divider position | image subset | images of training image set 111 in image subset |
|---|---|---|
| 262 | 282 | 112(2) |
| 263 | 283 | 112(3) |
| 264 | 284 | 112(4) |
| 265 | 285 | 112(5) |

In a second example of step 350, system 100 repeats, for divider positions 262-265 (and corresponding image subsets 282-285), steps 310, 320, 330, 332, and 340, where step 340 includes both 342 and 344. This second example of step 350 provides positive match counts, negative match counts, and error counts shown in Tables 6 and 7.

Table 6 shows values positive match counts 141, negative match counts 142, and error counts 143 error counts corresponding to divider positions 261-265 associated with respective image subsets 271 and 282-285. Table 6 includes ten columns labeled (c1)-(c10). When repeated as part of step 330, classifier evaluation system 100 may write cumulative negative-match counts of column (c7) and cumulative positive-match counts of columns (c8) to memory 110 as cumulative negative-match counts 152(2-5) and cumulative positive-match counts 151(2-5) respectively. In Tables 6 and 7, match counts and error counts corresponding to image subset 271 are not cumulative.

Each row of column (c10) shows an error count corresponding to an image subset denoted in column (c2). For a given row, each error count is computed as the cumulative positive match count subtracted from the sum of the cumulative negative match count and the number of images in the training image set belonging to the object class (number of faces). Expressed in terms of column labels, (c9)=(c6)+(c7)−(c8).

Without departing from the scope hereof, any match count or error count of Tables 4-7 may be expressed as a match rates or error rate by dividing the match count or error count by the number of training images in training image set 111. Without departing from the scope hereof, a training image set may include more than one divider position corresponding to a minimum error count. For example, a training image set 111 where training image 112(4) is a non-face would have two divider positions (261 and 263) corresponding to a minimum error count.

Recall that the difference between the first example of step 350 and the second example of step 350 is that the latter step includes step 344 of method 300. Comparing outputs of first example of step 350 (Tables 4 and 5) with outputs of the

TABLE 6

| (c1) divider position | (c2) image subset | (c3) # of images in image subset | (c4) negative-match count 142 | (c5) positive-match count 141 | (c6) # images in object class, $N_1$ | (c7) cum. negative-match count 152 | (c8) cum. positive-match count 151 | (c9) cumulative error count 153: (c6) + (c7) − (c8) | (c10) number of classifier operations |
|---|---|---|---|---|---|---|---|---|---|
| 260 | null | 0 | 0 | 0 | 3 | 0 | 0 | 3 | 0 |
| 261 | 271 | 1 | 0 | 1 | 3 | 0 | 1 | 2 | 1 |
| 262 | 282 | 1 | 1 | 0 | 3 | 1 | 1 | 3 | 1 |
| 263 | 283 | 1 | 0 | 1 | 3 | 1 | 2 | 2 | 1 |
| 264 | 284 | 1 | 0 | 1 | 3 | 1 | 3 | 1 | 1 |
| 265 | 285 | 1 | 1 | 0 | 3 | 2 | 3 | 2 | 1 |

Inspection of Table 6 reveals that divider positions 264 has the smallest error count, and hence corresponds to an optimal divider position. Note that error counts of column (c9) of Table 6 equal error counts of column (c7) of Table 3.

Error counts may also be computed to find divider positions corresponding to maximum error counts, as shown in Table 7. Table 7 differs from Table 6 in two ways. First, column (c6) denotes the number of images in the training image set not in the object class. Second, error counts are computed as the cumulative negative match count (c7) subtracted from the sum of column (c6) and the cumulative positive match count, column (c8). Error counts of Table 6 and Table 7 provide the same information about classifier 181, as each error count of Table 7 is a complement of its corresponding error count in Table 6 —their sum equals the number of images (five) in training image set 111.

Inspection of Table 7 reveals that divider positions 264 has the maximum error count, and hence corresponds to an optimal divider position. Note that error counts of column (c9) of Table 7 equal error counts of column (c7) of Table 4.

second example of step 350 (Tables 6 and 7) shows the improved computational efficiency associated with including step 344. Inspection of column (c8) of Tables 4 and 5 shows that for training image set 111 (N=5 images) generating error counts for each divider position 260-265 using steps 340 and 342 (and not 344) requires $C_{min} = \Sigma_{k=1}^{k=5} k = 15$ classification operations by classifier 181. In general, for a training image set having N images, method 300 using steps 340 and 342 (and not 344) requires $$C_{min} = \sum_{k=n}^{k=N} k = \frac{N(N+1)}{2}$$

classification operations by classifier 181. Generating the error counts of Tables 6 and 7, which result from step 340 including step 344, requires just five classification operations, which generalizing to $C_{min}=N$, the number of images in training image set 111. For training image sets having

TABLE 7

| (c1) divider position | (c2) image subset | (c3) # of images in image subset | (c4) negative-match count 142 | (c5) positive-match count 141 | (c6) # images not in object class, $N_0$ | (c7) cum. negative-match count 152 | (c8) cum. positive-match count 151 | (c9) cumulative error count 153: (c6) + (c8) − (c7) | (c10) number of classifier operations |
|---|---|---|---|---|---|---|---|---|---|
| 260 | null | 0 | 0 | 0 | 2 | 0 | 0 | 2 | 0 |
| 261 | 271 | 1 | 0 | 1 | 2 | 0 | 1 | 3 | 1 |
| 262 | 282 | 1 | 1 | 0 | 2 | 1 | 1 | 2 | 1 |
| 263 | 283 | 1 | 0 | 1 | 2 | 1 | 2 | 3 | 1 |
| 264 | 284 | 1 | 0 | 1 | 2 | 1 | 3 | 4 | 1 |
| 265 | 285 | 1 | 1 | 0 | 2 | 2 | 3 | 3 | 1 | large N, e.g., N>1000, a classifier evaluation method with $C_{min} \propto N$, and systems executing the method, offers great speed advantages compared to a method, and a systems executing the method, having $C_{min} \propto N^\alpha$, $\alpha > 1$.

In step 360, method 300 determines optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

In an example of step 360, comparison module 128 of classifier evaluation system 100 determines optimality status 195 of classifier 181 comparing the optimal divider positions for training image set 111, determined in step 350 as divider position 264 (based on classifier results 182(11-15)), to a predetermined optimal divider position corresponding to a predetermined minimum-error count associated with training image set 111. As noted in discussion of divider positions shown in Tables 1 and 2, divider position 264 also corresponds to the predetermined optimal divider position, which indicates that each classifier result 182(11-15) is accurate with respect to corresponding images 112(1-5). In this example, classifier evaluation system 100 determines and outputs optimality status 195 having a value indicating that classifier 181 is optimally trained.

If each classifier result 182 is not accurate, the optimal divider position determined in step 350 is not guaranteed to match the predetermined optimal divider position. For example, Table 8 shows error counts corresponding to a classifier result set 222, which includes classifier results 182(1-5), as shown in FIG. 2. Classifier results 182(1-4) are correct, while classifier result 182(5) incorrectly classifies image 112(5) as a face. The optimal divider position resulting from this erroneous classification is divider position 265, which does not match the predetermined (and correct) optimal divider position 264 for training image set 111. In such this case, for classifier result set 222, classifier evaluation system 100 determines and outputs optimality status 195 having a value indicating that classifier 181 is not optimally trained.

TABLE 8

| (c1) divider position | (c2) image subset | (c3) # of images in image subset | (c4) negative-match count 142 | (c5) positive-match count 141 | (c6) # images in object class, $N_1$ | (c7) cum. negative-match count 152 | (c8) cum. positive-match count 151 | (c9) cumulative error count 153: (c6) + (c7) − (c8) |
|---|---|---|---|---|---|---|---|---|
| 261 | 271 | 1 | 0 | 1 | 3 | 0 | 1 | 2 |
| 262 | 282 | 1 | 1 | 0 | 3 | 1 | 1 | 3 |
| 263 | 283 | 1 | 0 | 1 | 3 | 1 | 2 | 2 |
| 264 | 284 | 1 | 0 | 1 | 3 | 1 | 3 | 1 |
| 265 | 285 | 1 | 0 | 1 | 3 | 1 | 4 | 0 |

Table 9 shows error counts corresponding to a classifier result set 232, which includes classifier results 182(6-10), as shown in FIG. 2. Classifier results 182(7-11) are correct, while classifier result 182(6) incorrectly classifies image 112(1) as a non-face. The optimal divider position resulting from this erroneous classification is divider position 264, which does match the predetermined (and correct) optimal divider position for training image set 111. However, the minimum cumulative error count is two, which does not match the correct minimum error count of one, as computed in Tables 3 and 6. In such this case, for classifier result set 232, classifier evaluation system 100 determines and outputs optimality status 195 having a value indicating that classifier 181 is not optimally trained.

TABLE 9

| (c1) divider position | (c2) image subset | (c3) # of images in image subset | (c4) negative-match count 142 | (c5) positive-match count 141 | (c6) # images in object class, $N_1$ | (c7) cum. negative-match count 152 | (c8) cum. positive-match count 151 | (c9) cumulative error count 153: (c6) + (c7) − (c8) |
|---|---|---|---|---|---|---|---|---|
| 261 | 271 | 1 | 1 | 0 | 3 | 1 | 0 | |
| 262 | 282 | 1 | 1 | 0 | 3 | 2 | 0 | 5 |
| 263 | 283 | 1 | 0 | 1 | 3 | 2 | 1 | 4 |
| 264 | 284 | 1 | 0 | 1 | 3 | 2 | 2 | 3 |
| 265 | 285 | 1 | 1 | 0 | 3 | 3 | 2 | 4 |

Features described above as well as those claimed below may be combined in various ways without departing from the scope hereof. The following examples illustrate some possible, non-limiting combinations:

(A1) A system for evaluating a classifier implemented within an ISP may include a microprocessor and memory storing a training image set having a plurality of images, the microprocessor being capable of sending each of the plurality of images to the ISP. The system also includes machine-readable instructions stored within the memory and executed by the microprocessor capable of: (i) selecting a subset of images of the training image set based upon a divider position within the training image set, (ii) controlling the ISP to classify each of the images in the subset as belonging to or not belonging to an object class, (iii) determining a positive-match count equal to total number of images in the image subset classified as belonging to the object class, (iv) determining an error count based upon (a) total number of images of the training image set belonging to the object class, and (b) the positive-match count, (v) repeating, for a plurality of other divider positions within the training image set, the steps of selecting, controlling, and determining to identify an optimal divider position corresponding to at least one of (a) a minimum-error count and (b) a maximum-error count; and (vi) determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

(A2) In the system denoted by (A1), the machine-readable instructions may be further capable of: (i) determining a negative-match count equal to total number of images in the image subset classified as not belonging to the object class; (ii) determining the error count as proportional to the positive-match count subtracted from sum of (a) the negative-match count and (b) the total number of images of the training image set belonging to the object class.

(A3) In any system denoted by one of (A1) and (A2), the training image set may include N total images capable of being indexed as 1, 2, . . . M, the divider position being denoted by a divider integer D between one and M+1 inclusive, the machine-readable instructions further capable of selecting a $D^{th}$ subset of images to include at least the $D^{th}$ image.

(A4) In any system denoted by (A3), the machine-readable instructions may further include machine-readable instructions that, when executed by the microprocessor, are capable of selecting the $D^{th}$ subset of images to include the first D images.

(A5) In any system denoted by one of (A3) and (A4), the machine-readable instructions may be further capable of: (i) selecting the $D^{th}$ subset of images to include only the $D^{th}$ image, and (ii) determining, for the $D^{th}$ subset where D>1, the error count as a cumulative error count partially based upon one previously-determined positive-match count and one previously-determined negative-match for the subset corresponding to divider integer D−1).

(A6) In any system denoted by one of (A1) through (A5), total number classifier operations performed by the classifier to determine at least one of the minimum-error count and the maximum-error count may be a linear function of total number of images in the training image set.

(A7) In any system denoted by one of (A1) through (A6), total number classifier operations performed by the classifier to determine at least one of the minimum-error count and the maximum-error count may equal total number of images in the training image set.

(A8) In any system denoted by one of (A1) through (A7), the plurality of other divider positions being each other possible divider position.

(B1) A method for evaluating a classifier implemented within an image signal processor (ISP) to identify an object class in a received electronic image signal is disclosed. The method includes steps of: (i) selecting a subset of images of a training image set based upon a divider position within the training image set, (ii) controlling the ISP to classify each of the images in the subset as either belonging or not belonging to the object class, (iii) determining a positive-match count equal to total number of images in the image subset classified as belonging to the object class, (iv) determining an error count based upon (a) total number of images of the training image set belonging to the object class, and (b) the positive-match count, (v) repeating, for a plurality of other divider positions within the training image set, the steps of selecting, controlling, and determining to identify an optimal divider position corresponding to at least one of (a) a minimum error count and (b) a maximum-error-count, and (vi) determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

(B2) The method denoted by one of (B1) may further include steps of (i) determining a negative-match count equal to total number of images in the image subset classified as not belonging to the object class, and (ii) determining the error count as proportional to the positive-match count subtracted from sum of (a) the negative-match count and (b) the total number of images of the training image set belonging to the object class.

(B3) In any methods denoted by one of (B1) and (B2), the training image set may include N total images capable of being indexed as 1, 2, . . . M, the divider position may be denoted by a divider integer D between one and M+1 inclusive, the step of selecting may further include: selecting an $D^{th}$ subset of images to include at least the $D^{th}$ image.

(B4) In any method denoted by (B3), the step of selecting may further include selecting the $D^{th}$ subset of images to include the first D images.

(B5) In any method denoted by (B3), the step of selecting may further include selecting the $D^{th}$ subset of images to include only the $D^{th}$ image, and the step of determining the error count may further include, for the $D^{th}$ subset where D>1, determining the error count as a cumulative error count partially based upon one previously-determined positive-match count and one previously-determined negative-match determined for the subset corresponding to divider integer (D−1).

(B6) In any method denoted by one of (B1) through (B5), the step of selecting may further include selecting a subset of images such that total number classifier operations performed by the classifier to determine at least one of the minimum-error count and the maximum-error count is a linear function of total number of images in the training image set.

(B7) In any method denoted by one of (B1) through (B6), the step of selecting may further include selecting a subset of images such that total number classifier operations performed by the classifier to determine at least one of the minimum-error count and the maximum-error count may equal total number of images in the training image set.

(B8) In any method denoted by one of (B1) through (B7), in the step of repeating, the plurality of other divider positions being each other possible divider position.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed:

1. A system for evaluating a classifier implemented within an image signal processor (ISP) comprising:
    a microprocessor and memory storing a training image set having a plurality of images, the microprocessor being capable of sending each of the plurality of images to the ISP, the plurality of images including Mtotal images indexable as 1, 2, . . . M; and
    machine-readable instructions stored within the memory and executed by the microprocessor capable of:
        selecting, based upon a divider position within the training image set denoted by a divider integer D between one and M+1 inclusive, the $D^{th}$ image of the plurality of images;
        controlling the ISP to classify the $D^{th}$ image as belonging to or not belonging to an object class;
        determining a positive-match count equal to zero when the $D^{th}$ image is classified as not belonging to the object class and equal to one when the $D^{th}$ image is classified as belonging to the object class;
        determining an error count based upon (a) total number of images of the training image set belonging to the object class, and (b) the positive-match count;
        repeating, for a plurality of other divider positions within the training image set, the steps of selecting, controlling, and determining to identify an optimal divider position corresponding to at least one of (a) a minimum-error count and (b) a maximum-error count, wherein total number classifier operations performed by the classifier to determine at least one of the minimum-error count and the maximum-error count equals total number of images in the training image set; and
        determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

2. The system of claim 1, the machine-readable instructions being further capable of:
    determining a negative-match count equal to one when the $D^{th}$ image is classified as not belonging to the object class; and
    determining the error count as proportional to the positive-match count subtracted from sum of (a) the negative-match count and (b) the total number of images of the training image set belonging to the object class.

3. The system of claim 1, the machine-readable instructions being further capable of:
    determining, for the $D^{th}$ image where D>1, the error count as a cumulative error count partially based upon one previously-determined positive-match count and one previously-determined negative-match count for the $(D-1)^{st}$ image of the plurality of images.

4. The system of claim 1, wherein total number classifier operations performed by the classifier to determine at least one of the minimum-error count and the maximum-error count is a linear function of total number of images in the training image set.

5. The system of claim 1, the plurality of other divider positions being each other possible divider position.

6. A method for evaluating a classifier implemented within an image signal processor (ISP) to identify an object class in a received electronic image signal, the method comprising:
    selecting, from a training image set having a plurality of images including M total images indexable as 1, 2, . . . , M, the $D^{th}$ image of the plurality of images where D denotes a divider position within the training image set;
    controlling the ISP to classify the $D^{th}$ image as belonging to or not belonging to an object class;
    determining a positive-match count equal to zero when the $D^{th}$ image is classified as not belonging to the object class and equal to one when the $D^{th}$ image is classified as belonging to the object class;
    determining an error count based upon (a) total number of images of the training image set belonging to the object class, and (b) the positive-match count;
    repeating, for a plurality of other divider positions within the training image set, the steps of selecting, controlling, and determining to identify an optimal divider position corresponding to at least one of (a) a minimum error count and (b) a maximum-error-count, wherein total number classifier operations performed by the classifier to determine at least one of the minimum-error count and the maximum-error count equals total number of images in the training image set; and
    determining optimality of the classifier by comparing at least one of (a) optimal divider position corresponding to a minimum-error count to a predetermined optimal divider position corresponding to a predetermined minimum-error count, and (b) optimal divider position corresponding to a maximum-error count to a predetermined optimal divider position and corresponding to a predetermined maximum-error count.

7. The method of claim 6, further comprising:
    determining a negative-match count equal to one when the $D^{th}$ image is classified as not belonging to the object class; and
    determining the error count as proportional to the positive-match count subtracted from sum of (a) the negative-match count and (b) the total number of images of the training image set belonging to the object class.

8. The method of claim 6,
    the step of determining the error count further comprising, for the $D^{th}$ image where D>1, determining the error count as a cumulative error count partially based upon one previously-determined positive-match count and one previously-determined negative-match count for the $(D-1)^{st}$ image of the plurality of images.

9. The method of claim 6, the step of selecting further comprising selecting the $D^{th}$ image such that total number classifier operations performed by the classifier to determine at least one of the minimum-error count and the maximum-error count is a linear function of total number of images in the training image set.

10. The method of claim 6, in the step of repeating, the plurality of other divider positions being each other possible divider position.

\* \* \* \* \*